US012768707B2

(12) United States Patent
Reiners et al.

(10) Patent No.: US 12,768,707 B2
(45) Date of Patent: Oct. 20, 2026

(54) METHOD AND SYSTEM FOR MONITORING THE STATE OF A DEVICE

(71) Applicant: Schaeffler Technologies AG & Co. KG, Herzogenaurach (DE)

(72) Inventors: Harald Reiners, Aachen (DE); Oliver Webber, Aachen (DE); Matti Seppä, Jyväskylä (FI)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 285 days.

(21) Appl. No.: 18/555,410

(22) PCT Filed: Mar. 8, 2022

(86) PCT No.: PCT/DE2022/100181

§ 371 (c)(1),
(2) Date: Oct. 13, 2023

(87) PCT Pub. No.: WO2022/218460

PCT Pub. Date: Oct. 20, 2022

(65) Prior Publication Data

US 2024/0385030 A1 Nov. 21, 2024

(30) Foreign Application Priority Data

Apr. 13, 2021 (DE) ......................... 102021109102.0

(51) Int. Cl.
*G01H 1/00* (2006.01)

(52) U.S. Cl.
CPC .................................. *G01H 1/003* (2013.01)

(58) Field of Classification Search
CPC ................................ G01H 1/003; G01H 3/00
See application file for complete search history.

(56) References Cited

U.S. PATENT DOCUMENTS

| | | | | |
|---|---|---|---|---|
| 6,370,957 | B1 | 4/2002 | Filippenko et al. | |
| 2010/0030492 | A1 * | 2/2010 | Kar ........................ | F16C 41/00 702/39 |
| 2010/0106458 | A1 * | 4/2010 | Leu ...................... | F04B 49/065 702/181 |
| 2018/0354088 | A1 | 12/2018 | Matsushita | |
| 2019/0203729 | A1 | 7/2019 | Nishimura | |
| 2020/0149993 | A1 | 5/2020 | Feng et al. | |

FOREIGN PATENT DOCUMENTS

| | | | |
|---|---|---|---|
| CN | 105531576 | A | 4/2016 |
| DE | 19945058 | A1 | 3/2001 |
| DE | 102017124281 | A1 | 2/2019 |

* cited by examiner

*Primary Examiner* — David Z Huang
(74) *Attorney, Agent, or Firm* — Price Heneveld LLP

(57) ABSTRACT

The disclosure relates to a method of and system for monitoring the state of a device that includes a rotatable component. The system includes a structure-borne noise meter and an evaluation device. The evaluation device ascertains a time range feature for a frequency band, compares the time range feature with at least one threshold to determine a time range feature state, and determines the state of the device based on the time range feature state.

20 Claims, 2 Drawing Sheets

METHOD AND SYSTEM FOR MONITORING THE STATE OF A DEVICE

CROSS-REFERENCE TO RELATED APPLICATIONS

This application is a U.S. national stage application under 35 U.S.C. § 371 that claims the benefit of priority under 35 U.S.C. § 365 of International Patent Application No. PCT/DE2022/100181, filed on Mar. 8, 2022, designating the United States of America, which in turn claims the benefit of priority under 35 U.S.C. §§ 119, 365 of German Patent Application No. 102021109102.0, filed Apr. 13, 2021, the contents of which are relied upon and incorporated herein by reference in their entirety.

FIELD OF THE DISCLOSURE

The disclosure relates to a method for monitoring a device state of a device, in particular a device having a rotatable component, wherein a structure-borne noise signal of the device is measured. Furthermore, the disclosure relates to a system for monitoring a device state of a device, in particular a device having a rotatable component, wherein the system comprises a structure-borne noise meter, which is designed to measure a structure-borne noise signal of the device.

BACKGROUND OF THE DISCLOSURE

Vibration-based monitoring of device states of a component can be used to detect and minimize unplanned machine failures caused by unexpected or unanticipated faults. Conventional systems for monitoring a device state usually require the extensive expertise of an expert during installation and operation. The costs and necessary effort related to the equipment, installation and operation are typically too high to enable widespread use.

Known state monitoring systems typically rely either on a machine-specific configuration that requires expert knowledge and frequently local customization in order to enable monitoring of the machine state, or they use only vibration signal power, which provides only very basic state monitoring information and with which reliable monitoring of a device state of a device is usually not possible.

DE 10 2017 124 281 A1 describes a method for monitoring an operating state of a device, in particular a device having a rotating component, wherein a structure-borne noise signal of the device is measured and a spectrum (X) or an envelope of the structure-borne noise signal is ascertained, and at least one spectral audio feature (M1, M2) of the ascertained spectrum (X) is determined in order to ascertain an operating state of the device.

U.S. Pat. No. 6,370,957 B1 describes a method for determining the operating state of a rotary machine, comprising monitoring the machine under a base operating condition and acquiring base vibration data.

DE 199 45 058 A1 describes a method for determining the remaining service life of the switching contacts in an electrical switching device, wherein structure-borne noise signals of the switching contact arrangement generated by the switching operation are detected, these are then subjected to a Fourier transformation in order to generate a sonogram in individual time windows, and individual function values are ascertained specifically from the sonogram and evaluated by means of an evaluation device.

SUMMARY OF THE DISCLOSURE

It is an object of the present disclosure to provide a reliable and/or inexpensive method for monitoring a device state of a device, which preferably allows for uncomplicated installation and/or operability of the monitoring system. Furthermore, it is an object to provide a corresponding system.

According to the disclosure, the object is achieved by a method for monitoring a device state of a device, in particular a device having a rotatable component, wherein a structure-borne noise signal of the device is measured, characterized in that during the operation of the device

- at least one first time range feature is ascertained for a first frequency band of the structure-borne noise signal, and
- at least one second time range feature is ascertained for a second frequency band of the structure-borne noise signal, wherein the first time range feature of the first frequency band ascertained during the operation of the device is compared with an upper and/or a lower first threshold such that a first time range feature state is determined, wherein the second time range feature of the second frequency band ascertained during the operation of the device is compared with an upper and/or a lower second threshold such that a second time range feature state is determined, wherein a device state of the device is determined and/or checked at least on the basis of the first time range feature state and/or the second time range feature state.

According to the disclosure, a cost-efficient and reliable state monitoring can be achieved, which at the same time is particularly advantageously automated, so that the requirements on the technical expertise of the user of the monitoring system can be kept low. This makes it possible to apply improved state monitoring to a wide range of devices and machines for which systems and methods known from the prior art would be too costly and not economical. According to the disclosure, it is particularly advantageous that faults or defects in the device can be detected and assessed without a configuration by a user being required. Mechanical defects in devices with rotating components can be detected by monitoring machine vibrations. Initially, defects typically reveal themselves in either a lower or an upper frequency band. As the fault severity increases, the excitation resulting from the fault increases in amplitude and may also propagate over wider frequency ranges.

Preferably, the device state of the device is determined and/or checked at least on the basis of the first time range feature state and the second time range feature state.

According to the disclosure, it is conceivable that the method is a computer-implemented method. In particular, one, several, or all steps of the method are carried out by a computer, in particular, in an automated manner.

The device state determined and/or checked according to the disclosure indicates, in particular, whether the device is functioning normally or without a fault, or whether there is a fault and/or an indication of a fault.

Preferably, it is possible for automatic alerting to take place depending on the determined device state of the device. Thus, a particularly advantageous oscillation-based or vibration-based state monitoring system with automatic alerting methods can be achieved.

In particular, the rotatable component is a component that rotates during the operation of the device. Such a rotating component typically results in a measurable structure-borne noise signal. With the aid of the present disclosure, for example, fault conditions in rolling bearings or toothings can be detected at an early stage. Advantageously, this enables timely planning of maintenance activities and reduces the likelihood of unplanned downtimes occurring.

According to the disclosure, it is possible, for example, to use an audio feature-based anomaly detection that is responsive to a change in sound or tone or a change in the structure-borne noise signal of the device, and further to use a frequency-dependent evaluation of the structure-borne noise signal, such as of the energy of the structure-borne noise signal, in order to assess the severity of the fault.

According to one embodiment of the present disclosure, it is conceivable that during the operation of the device one or more further first time range features are ascertained for the first frequency band of the structure-borne noise signal and/or one or more further second time range features are ascertained for the second frequency band of the structure-borne noise signal, wherein the further first time range feature(s) ascertained during the operation of the device are each compared with an upper and/or a lower further first threshold such that one or more further first time range feature states are determined, and/or wherein the further second time range feature(s) ascertained during the operation of the device are each compared with an upper and/or a lower further second threshold such that one or more further second time range feature states are determined, wherein the device state of the device is additionally determined and/or checked on the basis of the further first time range feature state(s) and/or the further second time range feature state(s). This makes it particularly advantageous to use several first time range features for the first frequency band of the structure-borne noise signal and/or several second time range features for the second frequency band of the structure-borne noise signal for state monitoring, whereby a particularly high degree of reliability can be achieved.

According to one embodiment of the present disclosure, it is conceivable that in a training phase, in which the device is in particular in a predetermined good state and/or normal operation, the first time range feature of the first frequency band of the structure-borne noise signal of the device and the second time range feature of the second frequency band of the structure-borne noise signal of the device are determined wherein, using the first time range feature of the first frequency band determined in the training phase, the upper and/or the lower first threshold relating to the first time range feature are determined and, in particular, stored, wherein, using the second time range feature of the second frequency band determined in the training phase, the upper and/or the lower second threshold relating to the second time range feature are determined and, in particular, stored. Particularly advantageously, it is possible for the training phase to be performed in an automated manner, in particular prior to the state monitoring during the operation of the device. This allows the thresholds to be determined automatically and thus particularly conveniently, so that user-friendliness can be increased and the susceptibility to errors be reduced. The storing of the thresholds can be performed, for example, in a memory of a computer.

According to one embodiment of the present disclosure, it is conceivable that in the training phase one or more further first time range features of the first frequency band of the structure-borne noise signal of the device and/or one or more further second time range features of the second frequency band of the structure-borne noise signal of the device are determined, wherein, using the further first time range feature(s) determined in the training phase, in each case an upper and/or in each case a lower further first threshold, in particular for each of the first time range features, is determined and, in particular, stored, wherein, using the further second time range feature(s) determined in the training phase, in each case an upper and/or in each case a lower further second threshold, in particular for each of the second time range features, is determined and, in particular, stored. Thus, thresholds can also be determined in each case for other time range features in the training phase, which can then be used during the operation of the device while monitoring the device state of the device.

According to one embodiment of the present disclosure, it is conceivable that the first time range feature is one of the following features of the structure-borne noise signal relating to the first frequency band:

mean square deviation and/or standard deviation,
kurtosis,
energy, wherein in particular the further first time range feature(s) are each one of the following features of the structure-borne noise signal relating to the first frequency band:

mean square deviation and/or standard deviation,
kurtosis,
energy.

Other time range features specifically designed to monitor device states are also conceivable. The first time range feature and the further first time range feature(s) are preferably different features from one another.

According to one embodiment of the present disclosure, it is conceivable that the second time range feature is one of the following features of the structure-borne noise signal relating to the second frequency band:

mean square deviation and/or standard deviation,
kurtosis,
energy, wherein in particular the further second time range feature(s) are each one of the following features of the structure-borne noise signal relating to the second frequency band:

mean square deviation and/or standard deviation,
kurtosis,
energy.

Other time range features specifically designed to monitor device states are also conceivable. The second time range feature and the further second time range feature(s) are preferably different features from one another.

According to one embodiment of the present disclosure, it is conceivable that the structure-borne noise signal is a time range signal, wherein the structure-borne noise signal comprises in particular one or more of the following signals:

vibration acceleration signal,
vibration velocity signal,
vibration deflection signal. This makes it possible to use advantageous structure-borne noise signals for the method, which are ascertained using a structure-borne noise meter on the device.

According to one embodiment of the present disclosure, it is conceivable that the first frequency band is a lower frequency band of the structure-borne noise signal and wherein the second frequency band is an upper frequency band of the structure-borne noise signal. In particular, the lower frequency band is below the upper frequency band. It is conceivable that the lower and upper frequency bands are spaced apart from one another. Alternatively, it is conceivable that the lower and upper frequency bands adjoin one another.

It is possible according to one embodiment of the present disclosure that the lower frequency band comprises a frequency range from 0 Hz to 750 Hz and/or that the upper frequency band comprises a frequency range from 750 Hz to 3000 Hz, preferably to 5000 Hz. In particular, it is conceivable that the lower frequency band extends from 0 Hz to 750 Hz and/or that the upper frequency band extends from 750 Hz to 3000 Hz, preferably from 750 Hz to 5000 Hz. Other values for the frequency bands are also conceivable. It is conceivable that technical characteristics of the device and/or empirical values concerning the device and/or technical restrictions are taken into account for the specific selection of the frequency bands. It is conceivable that the lower frequency band and/or the upper frequency band are fixed. Alternatively, it would be possible for the lower frequency band and/or the upper frequency band to be variable.

According to the disclosure, it is provided that the first time range feature state can be assigned to one of at least three categories, in particular to one of the following categories:

"normal",

"elevated",

"high", wherein the ascertained first time range feature state is "normal" if the first time range feature of the first frequency band ascertained during the operation of the device is below the lower first threshold and below the upper first threshold, wherein the ascertained first time range feature state is "elevated" if the first time range feature of the first frequency band ascertained during the operation of the device is above the lower first threshold and below the upper first threshold, wherein the ascertained first time range feature state is "high" if the first time range feature of the first frequency band ascertained during the operation of the device is above the lower first threshold and above the upper first threshold, and/or wherein the second time range feature state can be assigned to one of at least three categories, in particular one of the following categories:

"normal",

"elevated",

"high", wherein the ascertained second time range feature state is "normal" if the second time range feature of the second frequency band ascertained during the operation of the device is below the lower second threshold and below the upper second threshold, wherein the ascertained second time range feature state is "elevated" if the second time range feature of the second frequency band ascertained during the operation of the device is above the lower second threshold and below the upper second threshold, wherein the ascertained second time range feature state is "high" if the second time range feature of the second frequency band ascertained during the operation of the device is above the lower second threshold and above the upper second threshold. In particular, the designation of the categories as "normal," "elevated," and "high" is to be understood merely as an exemplary embodiment and not as restrictive. According to the disclosure, any other designations for the categories are also conceivable.

Accordingly, according to one embodiment of the present disclosure in which one or more further first time range features are used, it is possible for the one or more further first time range feature states each to be assignable to one of at least three categories, in particular to one of the following categories:

"normal",

"elevated",

"high", wherein an ascertained further first time range feature state is "normal" if the corresponding further first time range feature of the first frequency band ascertained during the operation of the device is below the corresponding lower further first threshold and below the corresponding upper further first threshold, wherein an ascertained further first time range feature state is "elevated" if the corresponding further first time range feature of the first frequency band ascertained during the operation of the device is above the corresponding lower further first threshold and below the corresponding upper further first threshold, wherein an ascertained further first time range feature state is "high" if the corresponding further first time range feature of the first frequency band ascertained during the operation of the device is above the corresponding lower further first threshold and above the corresponding upper further first threshold.

Accordingly, according to one embodiment of the present disclosure in which one or more further second time range features are used, it is possible for the one or more further second time range feature states each to be assignable to one of at least three categories, in particular to one of the following categories:

"normal",

"elevated",

"high", wherein an ascertained further second time range feature state is "normal" if the corresponding further second time range feature of the second frequency band ascertained during the operation of the device is below the corresponding lower further second threshold and below the corresponding upper further second threshold, wherein an ascertained further second time range feature state is "elevated" if the corresponding further second time range feature of the second frequency band ascertained during the operation of the device is above the corresponding lower further second threshold and below the corresponding upper further second threshold, wherein an ascertained further second time range feature state is "high" if the corresponding further second time range feature of the second frequency band ascertained during the operation of the device is above the corresponding lower further second threshold and above the corresponding upper further second threshold.

According to one embodiment of the present disclosure, it is conceivable that the ascertained device state of the device can be assigned to one of at least four categories, wherein the categories comprise in particular the following state categories:

OK and/or normal, suspicion of fault and/or suspected fault, warning, significant warning and/or danger.

The designation of the categories for the device state of the device is only to be understood as an exemplary embodiment and not as restrictive. According to the disclosure, any other designations for the categories are also conceivable.

According to one embodiment of the present disclosure, it is conceivable that the ascertained device state of the device is ascertained from the individual time range feature states considered such that:

(i) if at least one of the considered time range feature states is "elevated", the ascertained device state of the device is "suspicion of fault" and/or "suspected fault";

(ii) if at least one of the considered time range feature states is "high", the ascertained device state of the device is "warning";

(iii) if at least one of the considered first and/or further first time range feature states of the first frequency band is "elevated" and at least one of the considered second and/or further second time range feature states of the second frequency band is "elevated", the ascertained device state of the device is "warning";

(iv) if at least one of the considered first and/or further first time range feature states of the first frequency band is "high" and at least one of the considered second and/or further second time range feature states of the second frequency band is "high", the ascertained device state of the device is "significant warning" and/or "danger";

(v) if all of the considered time range feature states are "normal" and/or none of the preceding conditions (i) to (iv) are satisfied, the ascertained device state of the device is "OK" and/or "normal"; and (vi) if several of the preceding conditions (i) to (v) are simultaneously satisfied, the ascertained device state of the device is the device state with the highest warning level resulting from the individual conditions (i) to (v).

According to one embodiment of the present disclosure, it is conceivable that an embodiment of the present disclosure, in particular an embodiment of the present disclosure described above, can be combined with an additional audio feature-based anomaly detection, for example a detection according to DE 10 2017 124 281 A1. It is conceivable that when an anomaly is detected according to a method of DE 10 2017 124 281 A1, the device state of the device is assigned at least to the category "suspicion of fault" and/or "suspected fault" (or even to the category "warning" or "significant warning" and/or "danger").

According to one embodiment of the present disclosure, it is conceivable that an embodiment of the present disclosure, in particular an embodiment of the present disclosure described above, is combined with a consideration and/or evaluation of a temperature of the device. For this purpose, a temperature gauge is preferably provided, which is designed to measure a temperature of the device. If the measured temperature of the device is "elevated" (in particular, is above a first temperature threshold), the device state of the device is assigned at least to the category "suspicion of fault" and/or "suspected fault". If the measured temperature of the device is "high" (in particular, is above a second temperature threshold greater than the first temperature threshold), the device state of the device is assigned at least to the category "warning".

According to one embodiment of the present disclosure, it is conceivable that an embodiment of the present disclosure, in particular an embodiment of the present disclosure described above, is combined with a standard vibration signal feature for which known thresholds exist. This can be, for example, a velocity RMS (root mean square) value as defined in ISO 20816. By applying such a standardized absolute threshold, possible difficulties in determining the lower and upper (first and second) thresholds for the first time range feature/second time range feature/further first time range feature/further second time range feature, etc., (in the training phase, if the device is not in a normal state (good state) during this time) can be particularly advantageously reduced.

According to one embodiment of the present disclosure, it is conceivable that an embodiment of the present disclosure, in particular an embodiment of the present disclosure described above, is combined with rules for ascertaining the type or nature of a defect or fault. For example, if the ascertained device state of the device has a category of "warning" or "significant warning" and/or "danger," it is conceivable that the probable nature of the fault is ascertained from the individual ascertained time range feature states (first time range feature state, second time range feature state, etc.). For this purpose, it is possible to use or take into account other additional information, for example the type of system/installation, when determining the type of fault.

According to one embodiment of the present disclosure, it is possible that depending on the ascertained device state, in particular in the case of an ascertained suspicion of a fault, a warning and/or a significant warning, a notification is automatically sent to a user so that the user can initiate countermeasures. Alternatively or additionally, it is conceivable that depending on the ascertained device state, in particular in the case of an ascertained suspicion of a fault, a warning and/or a significant warning, countermeasures are automatically initiated, for example a shutdown of the device. Other countermeasures are also conceivable alternatively or additionally.

A further object of the present disclosure is a system for monitoring a device state of a device, in particular a device having a rotatable component, wherein the system comprises a structure-borne noise meter, which is designed to measure a structure-borne noise signal of the device, characterized in that:

the system is designed such that:

during the operation of the device at least a first time range feature is ascertained for a first frequency band of the structure-borne noise signal, and at least a second time range feature is ascertained for a second frequency band of the structure-borne noise signal, wherein the system is designed such that:

the first time range feature of the first frequency band ascertained during the operation of the device is compared with an upper and/or a lower first threshold such that a first time range feature state is determined, and the second time range feature of the second frequency band ascertained during the operation of the device is compared with an upper and/or a lower second threshold such that a second time range feature state is determined, wherein the system is designed such that a device state of the device is determined and/or checked at least on the basis of the first time range feature state and/or the second time range feature state.

In particular, the system comprises switching means or a computer designed to carry out the steps of a method according to one embodiment of the present disclosure, preferably in an automated manner. In this context, the features, embodiments and advantages that have already been described in connection with the method according to the disclosure or in connection with an embodiment of the method according to the disclosure can be applied to the system according to the disclosure.

BRIEF DESCRIPTION OF THE DRAWINGS

Further details and advantages of the disclosure will be explained below with reference to the exemplary embodiments shown in the drawings. In the figures.

DETAILED DESCRIPTION

Figure 1:
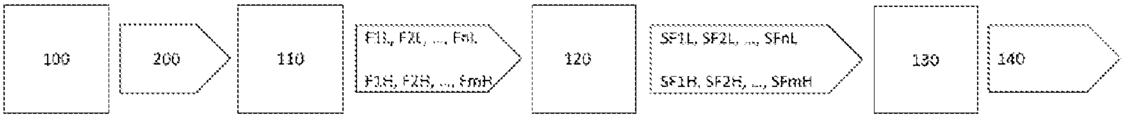
FIG. 1 shows a schematic representation of a method according to one embodiment of the present disclosure.

Referring to FIG. 1, using a structure-borne noise meter 2, data recording 100 is carried out during the operation of a device 1, during which a structure-borne noise signal 200 (or vibration signal) relating to the device 1 is ascertained.

In a feature extraction 110, at least one first time range feature F1L and preferably one or more further first time range features F2L, . . . , FnL are ascertained for a first frequency band of the structure-borne noise signal 200. "F1L, . . . , FnL" here denote a total of "n" first time range features, wherein "n" is a natural number ("n" may be, for example, 2, 3, 4, 5, 6, 7, etc.). Furthermore, the feature extraction 110 ascertains at least one second time range feature F1H and preferably one or more further second time range features F2H, . . . , FmH for a second frequency band of the structure-borne noise signal 200. "F1H, . . . , FmH" here denote a total of "m" second time range features, wherein "m" is a natural number ("m" may be, for example, 2, 3, 4, 5, 6, 7, etc.).

In a feature state assessment 120, the ascertained first time range features F1L, . . . , FnL of the first frequency band are in each case compared with an upper and a lower first threshold. By means of this comparison, a corresponding own first time range feature state SF1L, . . . , SFnL is determined for each of the considered first time range features F1L, . . . , FnL.

Furthermore, in the feature state assessment 120, the ascertained second time range features F1H, . . . , FmH of the second frequency band are in each case compared with an upper and a lower second threshold. By means of this comparison, a corresponding second time range feature state SF1H, . . . , SFmH is determined for each of the considered second time range features F1H, . . . , FmH.

In a device state assessment 130, the device state 140 of the device 1 is then determined from the ascertained time range feature states SF1L, . . . , SFnL, SF1H, . . . , SFmH.

According to one embodiment of the present disclosure, a method according to the disclosure can comprise the following steps.

Two sets of one or more time range features F1L, . . . , FnL and F1H, . . . , FmH are, in each case, defined for a lower and an upper frequency band of a time range vibration signal (or structure-borne noise signal 200), which are used to ascertain a device state 140 of a device 1. The time range features F1L, . . . , FnL and F1H, . . . , FmH can comprise, for example, a standard deviation, a kurtosis, or other features specifically designed for vibration-based state monitoring systems. The time range vibration signal (or structure-borne noise signal 200) can be, for example, an acceleration signal or a velocity signal, which is ascertained, for example, by means of a structure-borne noise meter 2 on the device 1.

Baseline values for the considered time range features are preferably ascertained in an initial training phase during which the device 1 is in an assumed good state and in operation. From these baseline values, an upper and a lower threshold each are determined for each of the considered time range features F1L, . . . , FnL and F1H, . . . , FmH (and in particular per frequency band).

By monitoring the considered time range features F1L, . . . , FnL and F1H, . . . , FmH during further operation of the device 1, in particular after the training phase has been completed, a time range feature state SF1L, . . . , SFnL and SF1H, . . . , SFmH can be ascertained for each of the considered time range features F1L, . . . , FnL and F1H, . . . , FmH:

- "normal"—the value of the measured time range feature F1L, . . . , FnL and F1H, . . . , FmH is below the lower and below the upper threshold;
- "elevated"—the value of the measured time range feature F1L, . . . , FnL and F1H, . . . , FmH is between the lower and the upper threshold;
- "high"—the value of the measured time range feature F1L, . . . , FnL and F1H, . . . , FmH is both above the lower and above the upper threshold.

Statistical evaluation methods may be used to minimize the influence of random outliers and/or noise when ascertaining the time range features F1L, . . . , FnL and F1H, . . . , FmH during the operation of the device 1. A variety of evaluation methods can be considered for this purpose.

The device state 140 of the device 1 is obtained from the individual ascertained time range feature states SF1L, . . . , SFnL and SF1H, . . . , SFmH of the considered time range features F1L, . . . , FnL and F1H, . . . , FmH, in particular in accordance with the behavior of the development (previously already described) with respect to the amplitude and frequency range of the excitations:

Initially, defects typically reveal themselves in either a lower or an upper frequency band. As the fault severity increases, the excitation resulting from the fault increases in amplitude and may also propagate over wider frequency ranges.

The ascertained device state 140 of the device 1 can be specified using, for example, the following categories or classes:

- "OK" and/or "normal",
- "suspicion of fault" and/or "suspected fault",
- "warning",
- "significant warning" and/or "danger".

According to one exemplary embodiment, the ascertained device state 140 of the device 1 is obtained from the individual time range feature states SF1L, . . . , SFnL, SF1H, . . . , SFmH considered as follows:

- If at least one of the considered time range feature states is "elevated", the ascertained device state 140 of the device 1 is "suspicion of fault" and/or "suspected fault".
- If at least one of the considered time range feature states is "high", the ascertained device state 140 of the device 1 is "warning".
- If at least one of the considered first (or further first) time range feature states of the first (in particular lower) frequency band is "elevated" and at least one of the considered second (or further second) time range feature states of the second (in particular upper) frequency band is "elevated", the ascertained device state 140 of the device 1 is "warning".

If at least one of the considered first (or further first) time range feature states of the first (in particular lower) frequency band is "high" and at least one of the considered second (or further second) time range feature states of the second (in particular upper) frequency band is "high", the ascertained device state 140 of the device 1 is "significant warning" and/or "danger".

If all considered time range feature states are "normal" or none of the above conditions are satisfied, the ascertained device state 140 of the device 1 is "OK" and/or "normal".

If several of the above conditions are satisfied simultaneously, the ascertained device state 140 of the device 1 is the one with the highest warning level resulting from the individual conditions.

It is possible that depending on the ascertained device state 140, in particular in the case of an ascertained suspicion of a fault, a warning and/or a significant warning, a notification is automatically sent to a user so that the user can initiate countermeasures. Alternatively or additionally, it is conceivable that depending on the ascertained device state 140, in particular in the case of an ascertained suspicion of a fault, a warning and/or a significant warning, countermeasures are automatically initiated, for example a shutdown of the device 1.

Figure 2:
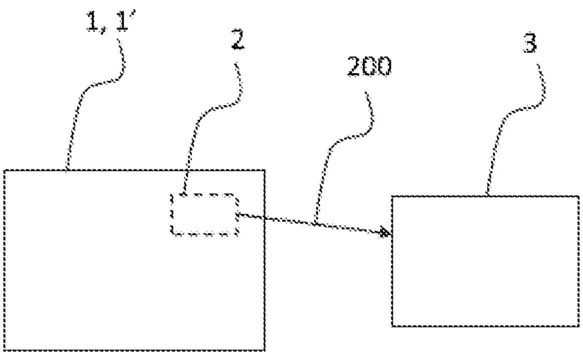
FIG. 2 shows a schematic representation of a system according to one embodiment of the present disclosure.

Referring to FIG. 2, a structure-borne noise meter 2 is mounted and/or arranged on a device 1 having a rotatable component 1'. The structure-borne noise meter 2 is designed to detect a structure-borne noise signal 200. The structure-borne noise signal 200 is provided to an evaluation device 3, in particular a computer, wherein the evaluation device 3 is designed to ascertain the time range features F1L, . . . , FnL, F1H, . . . , FmH, time range feature states SF1L, . . . , SFnL, SF1H, . . . , SFmH and the device state 140 of the device 1. In particular, the feature extraction 110, feature state assessment 120, and/or device state assessment 130 are performed by the evaluation device 3. It is conceivable that the evaluation device 3 is installed together with the structure-borne noise meter 2 or separately from the structure-borne noise meter 2.

LIST OF REFERENCE NUMERALS

1 Device
1' Rotatable component
2 Structure-borne noise meter
3 Evaluation device
100 Data recording
110 Feature extraction
120 Feature state assessment
130 Device state assessment
140 Device state
200 Structure-borne noise signal
F1L First time range feature
F2L, . . . , FnL Further first time range features
F1H Second time range feature
F2H, . . . , FmH Further second time range features
SF1L First time range feature state
SF2L, . . . , SFnL Further first time range feature states
SF1H Second time range feature state
SF2H, . . . , SFmH Further second time range feature states

The invention claimed is:

1. A method for monitoring a state of a device having a rotatable component, comprising the steps of:

measuring a structure-borne noise signal of the device during operation of the device;

ascertaining a first time range feature for a first frequency band of the structure-borne noise signal;

ascertaining a second time range feature for a second frequency band of the structure-borne noise signal;

comparing the first time range feature with an upper first threshold and a lower first threshold to determine a first time range feature state, wherein the first time range feature state is classified as a normal state if the first time range feature is below the lower first threshold and below the upper first threshold, the first time range feature state is classified as an elevated state if the first time range feature is above the lower first threshold and below the upper first threshold, and the first time range feature state is classified as a high state if the first time range feature is above the lower first threshold and above the upper first threshold;

comparing the second time range feature with an upper second threshold and a lower second threshold to determine a second time range feature state, wherein the second time range feature state is classified as a normal state if the second time range feature is below the lower second threshold and below the upper second threshold, the second time range feature state is classified as an elevated state if the second time range feature is above the lower second threshold and below the upper second threshold, and the second time range feature state is classified as a high state if the second time range feature is above the lower second threshold and above the upper second threshold; and determining the state of the device based on the first time range feature state and the second time range feature state, wherein the first frequency band is a lower frequency band of the structure-borne noise signal and the second frequency band is an upper frequency band of the structure-borne noise signal, and wherein the first frequency band is below the second frequency band and the first frequency band and the second frequency band are spaced apart from one another.

2. The method of claim 1, wherein the step of ascertaining the first time range feature further comprises ascertaining at least one additional first time range feature for the first frequency band of the structure-borne noise signal, the step of ascertaining the second time range feature further comprises ascertaining at least one additional second time range feature for the second frequency band of the structure-borne noise signal, the step of comparing the first time range feature further comprises comparing the at least one additional first time range feature with at least one additional upper first threshold and at least one additional lower first threshold to determine at least one additional first time range feature state, the step of comparing the second time range feature further comprises comparing the at least one additional second time range feature with at least one additional upper second threshold and at least one additional lower second threshold to determine at least one additional second time range feature state, and wherein the state of the device is further determined based on at least one of the at least one additional first time range feature state and the at least one additional second time range feature state.

3. The method of claim 1, further comprising the steps of:

ascertaining, during operation of the device in a training phase, the first time range feature of the first frequency band of the structure-borne noise signal;

ascertaining, during operation of the device in the training phase, the second time range feature of the second frequency band of the structure-borne noise signal;

determining the upper first threshold and the lower first threshold based on the first time range feature ascertained during operation of the device in the training phase; and determining the upper second threshold and the lower second threshold based on the second time range feature ascertained during operation of the device in the training phase.

4. The method of claim 3, wherein the step of ascertaining, during operation of the device in the training phase, the first time range feature of the first frequency band of the structure-borne noise signal further comprises ascertaining at least one additional first time range feature of the first frequency band of the structure-borne noise signal, the step of ascertaining, during operation of the device in the training phase, the second time range feature of the second frequency band of the structure-borne noise signal further comprises ascertaining at least one additional second time range feature of the second frequency band of the structure-borne noise signal, the step of determining the upper first threshold and the lower first threshold based on the first time range feature ascertained during operation of the device in the training phase further comprises determining at least one additional upper first threshold and at least one additional lower first threshold based on at least one additional first time range feature ascertained during operation of the device in the training phase, and the step of determining the upper second threshold and the lower second threshold based on the second time range feature ascertained during operation of the device in the training phase further comprises determining at least one additional upper second threshold and at least one additional lower second threshold based on at least one additional second time range feature ascertained during operation of the device in the training phase.

5. The method of claim 1, wherein the first time range feature is one of a mean square deviation, a standard deviation, kurtosis, and energy.

6. The method of claim 5, wherein the second time range feature is one of a mean square deviation, a standard deviation, kurtosis, and energy.

7. The method of claim 1, wherein the structure-borne noise signal is a time range signal and comprises at least one of a vibration acceleration signal, a vibration velocity signal, and a vibration deflection signal.

8. The method of claim 1, wherein the first frequency band is a lower frequency band of the structure-borne noise signal, and wherein the second frequency band is an upper frequency band of the structure-borne noise signal.

9. The method of claim 1, wherein the state of the device is determined to be (1) a suspected fault state if one of the determined first and second time range feature states is classified as an elevated state, (2) a warning state if the determined first and second time range feature states are classified as elevated states, (3) a danger state if at least one of the determined first and second time range feature states is classified as a high state, and (4) an OK state if the determined first and second time range feature states are classified as normal states.

10. The method of claim 1, further comprising the step of evaluating a temperature of the device using a temperature gauge to produce a measured temperature of the device.

11. The method of claim 10, further comprising the steps of comparing the measured temperature of the device to a first temperature threshold, wherein the measured temperature of the device is classified as an elevated state if the measured temperature of the device is above a first temperature threshold; and comparing the measured temperature of the device to a second temperature threshold, wherein the measured temperature of the device is classified as a high state if the measured temperature of the device is above a second temperature threshold.

12. The method of claim 11, wherein the state of the device is determined to be a suspected fault state if the measured temperature of the device is classified as an elevated state, and wherein the state of the device determined to be a warning state if the measured temperature of the device is classified as a high state.

13. A system for monitoring a state of a device that has a rotatable component, comprising:

a structure-borne noise meter that measures a structure-borne noise signal of the device; and an evaluation device that:

ascertains, during operation of the device in a training phase, a first time range feature of a first frequency band of the structure-borne noise signal, wherein the first frequency band is a lower frequency band of the structure-borne noise signal and the first time range feature is a mean square deviation of the first frequency band;

ascertains, during operation of the device in the training phase, a second time range feature of a second frequency band of the structure-borne noise signal, wherein the second frequency band is an upper frequency band of the structure-borne noise signal that is spaced apart from and above the first frequency band, and wherein the second time range feature is a mean square deviation of the second frequency band;

ascertains, during operation of the device, the first time range feature for the first frequency band of the structure-borne noise signal;

ascertain, during the operation of the device, the second time range feature for the second frequency band of the structure-borne noise signal;

compares the first time range feature of the first frequency band ascertained during the operation of the device, with at least one of an upper first threshold and a lower first threshold to determine a first time range feature state, wherein the upper first threshold and the lower first threshold are each determined based on the first time range feature ascertained during operation of the device in the training phase;

compares the second time range feature of the second frequency band ascertained during the operation of the device, with at least one of an upper second threshold and a lower second threshold to determine a second time range feature state, wherein the upper second threshold and the lower second threshold are each determined based on the second time range feature ascertained during operation of the device in the training phase; and determines the state of the device based on at least one of the first time range feature state and the second time range feature state.

14. A method for monitoring a state of a device having a rotatable component, comprising the steps of:

measuring a structure-borne noise signal during operation of the device in a training phase;

ascertaining a first time range feature of a first frequency band of the measured structure-borne noise signal;

ascertaining a second time range feature of a second frequency band of the measured structure-borne noise signal;

determining at least one first threshold based on the ascertained first time range feature; and determining at least one second threshold based on the ascertained second time range feature, wherein the first frequency band is a lower frequency band of the structure-borne noise signal and the second frequency band is an upper frequency band of the structure-borne noise signal, and wherein the first frequency band is below the second frequency band and the first frequency band and the second frequency band are spaced apart from one another.

15. The method of claim 14, further comprising the steps of:

comparing the first time range feature with the at least one first threshold to determine a first time range feature state; and comparing the second time range feature with the at least one second threshold to determine a second time range feature state.

16. The method of claim 15, further comprising the step of:

determining the state of the device based on at least one of the first time range feature state and the second time range feature state.

17. The method of claim 16, wherein the at least one first threshold comprises an upper first threshold and a lower first threshold.

18. The method of claim 16, wherein the at least one second threshold comprises an upper second threshold and a lower second threshold.

19. The system of claim 14, wherein the upper frequency band extends from 3,000 Hz to 5,000 Hz.

20. The system of claim 14, wherein the lower frequency band is variable.

* * * * *